United States Patent [19]

Patil et al.

[11] Patent Number: 4,525,217
[45] Date of Patent: Jun. 25, 1985

[54] PROCESS FOR PREPARING FERRIFERROCYANIDE PIGMENTS

[75] Inventors: Arvind S. Patil, Wyoming; John H. Bantjes, Holland; Louis J. Pepoy, Holland; Reinhard J. Sappok, Holland, all of Mich.

[73] Assignee: BASF Wyandotte Corporation, Wyandotte, Mich.

[21] Appl. No.: 490,364

[22] Filed: May 2, 1983

[51] Int. Cl.³ .................................... C09C 1/26
[52] U.S. Cl. .................................... 106/304; 423/367
[58] Field of Search .................. 106/304; 423/367

[56] References Cited

U.S. PATENT DOCUMENTS

| | | | |
|---|---|---|---|
| 2,275,929 | 3/1942 | Thomass | 106/304 |
| 2,592,169 | 7/1946 | Morrison et al. | 106/304 |
| 2,622,037 | 12/1952 | Göbel | 106/304 |
| 3,021,191 | 2/1962 | Rhodes | 423/367 |
| 3,915,733 | 10/1975 | Reinhardt et al. | 106/304 |
| 3,951,679 | 4/1976 | Bernhard et al. | 106/304 |
| 3,985,571 | 10/1976 | Reinhardt et al. | 106/304 |
| 4,046,861 | 9/1977 | Reihardt et al. | 106/304 |

*Primary Examiner*—John Kight
*Assistant Examiner*—Marvin L. Moore
*Attorney, Agent, or Firm*—William G. Conger; Joseph D. Michaels

[57] ABSTRACT

The subject invention relates to a process for preparing ferriferrocyanide pigments. The process comprises
(a) forming an aqueous reaction mixture comprising
 (i) a ferrous salt,
 (ii) a compound selected from the group consisting of sulfuric acid, hydrochloric acid, an inorganic potassium salt, and mixtures thereof, and
 (iii) an alkali metal ferrocyanide such that the molar ratio of (i) to (ii) to (iii) is about 1:1 to 0.9:1.5 to 1:1;
(b) oxidizing the acidic solution by aeration;
(c) heating the aerated solution to from 10° C. to 90° C.; and
(d) recovering the pigment.

6 Claims, No Drawings

PROCESS FOR PREPARING FERRIFERROCYANIDE PIGMENTS

BACKGROUND OF THE INVENTION

1. Field of the Invention

This invention relates to the preparation of inorganic pigments. More specifically, it relates to the preparation of ferriferrocyanide pigments, also known as iron blue pigments.

2. Description of the Prior Art

Ferriferrocyanide pigments are well known in the art. The term "ferriferrocyanide pigments" covers a variety of pigments with various chemical formulae. The chemical formula of the pigment will depend upon what the starting materials are and the specific reaction conditions. For a discussion of the various ferriferrocyanide pigments, see Temple C. Patton, Pigment Handbook, pages 401-407 (John Wiley & Sons, New York, 1973). This reference and the patent literature disclose that ferriferrocyanide pigments are prepared by the reaction of a solution of sodium ferrocyanide and ferrous sulfate in the presence of ammonium sulfate which forms the so-called Berlin White, $Fe(NH_4)_2Fe(CN)_6$. The Berlin White is digested in sulfuric acid and then oxidized with sodium bichromate or chlorate to give the ferriferrocyanide pigment. The pigment is washed, pressed, dried, and ground into a finished product. Several patents are quite specific in requiring that the reaction of the sodium ferriferrocyanide and ferrous sulfate be carried out in the presence of ammonium sulfate and do not suggest any substitutes for the ammonium sulfate. See for example U.S. Pat. Nos. 2,275,929, 2,592,169, and 3,021,191 all of which require that ammonium sulfate be used in the preparation of the ferriferrocyanide pigment described therein.

The use of ammonium sulfate creates problems with respect to processing. The process is expensive because the Berlin White intermediate which is formed must be dissolved in sulfuric acid and it is necessary to dispose of the excess sulfuric acid and sulfates. Therefore, it would be advantageous if a process could be developed which eliminated the formation of the Berlin White and the need to dissolve it in sulfuric acid.

U.S. Pat. No. 2,622,037 describes a process for preparing ferriferrocyanide pigments without the formation of Berlin White. The process comprises mixing an aqueous solution of a divalent iron salt with water solution of a water soluble salt of hydroferrocyanic acid to form a mixture, and treating the resulting mixture with nitrous acid to form an insoluble ferriferrocyanide compound. This process is quite different from the process which will be described herein.

SUMMARY OF THE INVENTION

The subject invention relates to a process for preparing ferriferrocyanide pigments in the absence of ammonium sulfate. The process comprises
(a) forming an aqueous reaction mixture comprising
  (i) a ferrous salt;
  (ii) a compound selected from the group consisting of sulfuric acid, hydrochloric acid, an inorganic potassium salt, and mixtures thereof; and
  (iii) an alkali metal ferrocyanide; such that the molar ratio of (i) to (ii) to (iii) is about 1:0.9:1 to 1:1.5:1;
(b) oxidizing the acidic solution by aeration;
(c) heating the aerated solution to a temperature of from 10° C. to 90° C.; and
(d) recovering the pigment.

The advantage of the process is that no significant amount of Berlin White intermediate is formed since ammonium sulfate is not used. Consequently, it is not necessary to use sulfuric acid to dissolve the Berlin White before oxidation. Moreover, oxidation is achieved by aeration. This is cost effective and reduces the stress to the environment. The resulting pigments are useful in coloring printing ink and carbon paper. Furthermore, the coloristic properties of the pigment are improved when oxidation occurs in an acid medium.

DESCRIPTION OF THE PREFERRED EMBODIMENT

The first step of the process involves forming a reaction mixture containing a ferrous salt; a compound selected from the group consisting of sulfuric acid, hydrochloric acid, an inorganic potassium salt, and mixtures thereof; and an alkali metal ferrocyanide. Generally, ferrous sulfate is preferred as the ferrous salt because of its availability. Hydrated forms of ferrous salts may also be used. Generally potassium sulfate or potassium chloride are preferred as the inorganic potassium salt. Generally, potassium or sodium ferrocyanide are preferred as the alkali metal ferrocyanide because of their availability. The mole ratio of ferrous salt (i) to compound (ii) to alkali metal ferrocyanide (iii) ranges from 1:0.9:1 to 1:1.5:1, preferably 1:1:1.

Since the ferrous salts and alkali metal ferrocyanide compound are solids at room temperature, it is necessary to dissolve them in a solvent. Preferably they are dissolved in water. Although the amount of water used to dilute the mixture is not critical, preferably the concentration of solids to liquid ranges from 100 grams per liter to 300 grams per liter. A preferred method of forming the reaction mixture is by dissolving the ferrous salt and compound (ii) in water and then adding the ferrocyanide compound. If sulfuric acid or hydrochloric acid are used as compound (ii), it is preferable to add it directly to the ferrous salt before adding the alkali metal ferrocyanide and diluting with water. The acidic solution is then oxidized by aeration in order to convert the ferrous ion to the ferric state. One can determine whether the reaction is complete by the development of color.

After completing the oxidation of the solution, the solution is heated at increased temperatures of from 10° C. to 90° C. Generally it is sufficient to heat the solution for about 30 to 60 minutes.

After the heating has been completed, the solution is filtered while it is still warm. It is then washed and dried at approximately 75° C.

The following examples will further illustrate in more detail the practice of this invention. The parts listed are by weight unless otherwise designated, and the temperatures are in degrees Centigrade unless otherwise designated. The examples which follow are intended to illustrate the practice of the subject invention, but are in no way intended to limit its application.

Example 1

In a reaction vessel equipped with an agitator and heat exchange means, 81 parts of ferrous sulfate heptahydrate were added. To this solid were added 20 parts of concentrated $H_2SO_4$ (96 percent). Then 3000 parts of water were added to the reaction vessel. The reaction mixture was stirred until dissolved and to it was added 145 parts of sodium ferrocyanide decahydrate [(Na$_4$FeCCN)$_6$10 H$_2$O] dissolved in about 200 parts water. The solution was then aerated from a 50 psi air line with an appropriate flow meter to control the airflow. The aeration continued for 30 minutes during which the pigment progressively became darker blue. The reaction mixture was then heated to 90° C. for two hours and the pigment was filtered from the hot slurry. It was then washed and dried at 75° C. to recover the ferriferrocyanide pigment. The pigment was dark blue color and had good tinctorial strength. It showed improved coloristic properties when compared to pigments produced by oxidation in a basic medium.

Example 2

Example 1 was duplicated except that in place of the 20 parts of H$_2$SO$_4$, four parts of H$_2$SO$_4$ and 176 parts of K$_2$SO$_4$ were used. The pigment produced had similar quality to that of Example 1.

EXAMPLE 3

Example 1 was duplicated except that in place of 20 parts of H$_2$SO$_4$, 10 parts of H$_2$SO$_4$ and 87 parts of K$_2$SO$_4$ were used. The pigment produced had similar quality to that of Example 1.

COMPARATIVE EXAMPLE

This comparison will show the effects of oxidizing in a basic medium rather than an acid medium.

In a reaction vessel equipped with an agitator and heat exchange means, 81 parts of ferrous sulfate heptahydrate were added. This was diluted with 3000 parts of ice and water to lower the starting reaction temperature to 10° C. The solution was stirred until dissolved and to it was added 145 grams of sodium ferrocyanide decahydrate [(Na$_4$Fe(CN)$_6$. 10H$_2$O] dissolved in about 200 parts of water. Ammonium hydroxide was then added under agitation to raise the pH to 9. The solution was then aerated from a 50 psi air line with an appropriate flow meter to control the airflow. The aeration continued for 30 minutes during which the pigment progressively became darker blue. The reaction mixture was then heated to 90° C. on the hot plate, after which all equipment was turned off and the pigment was filtered from the hot slurry. It was then washed and dried at 75° C. to recover the ferriferrocyanide pigment. A comparison between this pigment and the pigment of Examples 1-3 showed that it was greener than those pigments.

The embodiment of this invention in which an exclusive privilege or property is claimed are defined as follows:

1. A process for preparing a ferriferrocyanide pigment in the absence of ammonium sulfate in an acidic medium comprising
   (a) forming an aqueous reaction mixture comprising
      (i) a ferrous salt,
      (ii) a compound selected from the group consisting of sulfuric acid, hydrochloric acid, an inorganic potassium salt, and mixtures thereof, and
      (iii) an alkali metal ferrocyanide such that the molar ratio of (i) to (ii) to (iii) is about 1:0.9:1 to 1:1.5:1,
   (b) oxidizing the acidic solution by aeration;
   (c) heating the aerated solution to from 10° C. to 90° C.; and
   (d) recovering the pigment.

2. The process of claim 1 wherein the mole ratio of (i) to (ii) to (iii) is essentially 1:1:1.

3. The process of claim 1 wherein the ferrous salt is ferrous sulfate.

4. The process of claim 3 wherein the alkali metal ferrocyanide is selected from the group consisting of potassium ferrocyanide and sodium ferrocyanide.

5. The process of claim 4 wherein compound (ii) is sulfuric acid or hydrochloric acid.

6. The process of claim 5 wherein the acid is mixed with the ferrous salt prior to forming an aqueous reaction mixture.

* * * * *